UNITED STATES PATENT OFFICE.

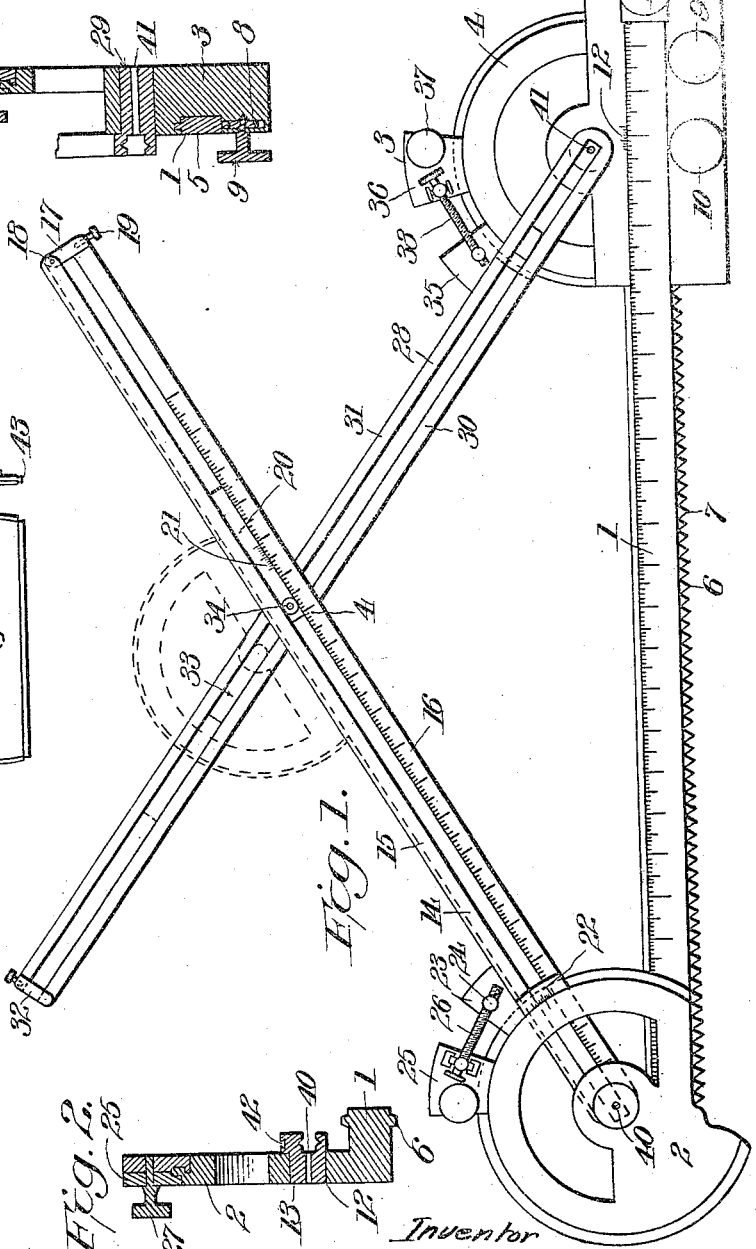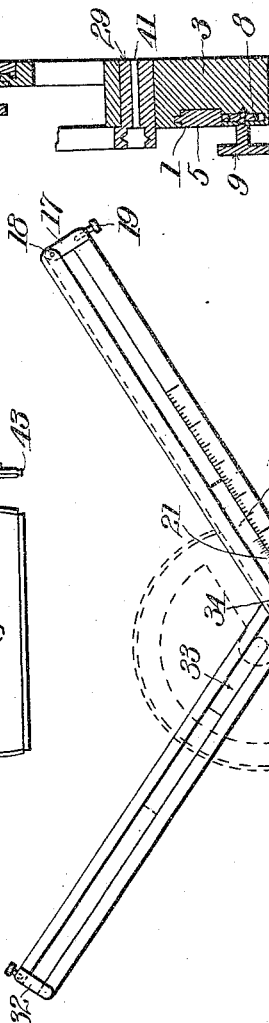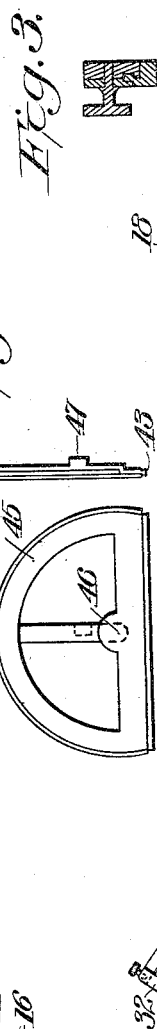

PAUL JONES, OF ONTARIO, OREGON, ASSIGNOR OF ONE-THIRD TO A. N. SOLISS, OF ONTARIO, OREGON.

SURVEYING INSTRUMENT.

997,826.        Specification of Letters Patent.        Patented July 11, 1911.

Application filed August 28, 1909, Serial No. 515,103. Renewed June 2, 1911. Serial No. 630,918.

*To all whom it may concern:*

Be it known that I, PAUL JONES, a citizen of the United States, residing at Ontario, in the county of Malheur, State of Oregon, have invented certain new and useful Improvements in Surveying Instruments, of which the following is a description, reference being had to the accompanying drawing, and to the letters and figures of reference marked thereon.

The invention relates to new and useful improvements in surveying and engineering instruments, and has for an object to provide an instrument for measuring the unknown sides and unknown angles of a triangle; also for determining the area of a triangle.

A further object of the invention is to provide an instrument whereby triangles and triangulation systems may be platted.

These and other objects will in part be obvious, and will in part be hereinafter more fully described.

In the drawings,—Figure 1 is a plan view of an instrument, embodying my invention; Fig. 2 is a section on the line 2—2 of Fig. 1; Fig. 3 is a section on the line 3—3 of Fig. 1; Fig. 4 is a section on the line 4—4 of Fig. 1; Fig. 5 is a detail, showing the thumb wheel for adjusting the protractor on the base member; Fig. 6 is a plan view of an attachment for my device for measuring an angle; and Fig. 7 is a side view of the same.

In carrying out my invention, I provide a base member 1, which may be of any desired length, and which is provided at one edge with a scale, which is preferably laid off in tenths or hundredths fractional parts.

At one end of the base member 1 is a protractor 2, which is rigidly connected to the base member. At the other end of the base member 1 is a slide 3, which is also provided with a protractor 4. The slide 3 is adapted to move freely back and forth on the base member 1. Said slide has a recess 5 in its upper face to receive the base member 1. The sides of the recess are rabbeted, so as to receive projecting ribs on the base member 1 and retain the same in said recess.

The rib 6 on the base member 1 is formed with a series of teeth 7. A toothed wheel 8 is journaled in the slide 3, and is adapted to engage the teeth 7 of the rib 6. Said wheel 8 is provided with a thumb screw 9, whereby said serrated wheel may be rotated and the base member 1 slid back and forth on the slide 3, or the slide moved back and forth on the base member 1. A second thumb wheel 10 may also be provided for moving the parts, if desired.

A clamping screw 11 carried by the slide 3 is adapted to engage the base member 1 and hold the same in its adjusted positions. I have provided the slide 3 with a vernier scale 12, which coöperates with the scale on the base member 1, whereby fine adjustments may be secured.

The protractor 2 has a central recess 12, which receives a pivot post 13, secured to a side member 14 in any desired way. Said side member 14, as herein shown, is composed of two parallel bars 15 and 16, which are secured at their outer ends by a clamping yoke 17. Said yoke is pivoted at 18 to one of the bars, and carries a thumb screw 19 at its outer end, which is adapted to engage the bar 16 and adjust the same toward or from the bar 15. Said bars 15 and 16 are recessed on their inner faces to form a guiding groove, which receives a rib on a sliding plate 20. Said plate 20 is adapted by this connection to slide between the bars 15 and 16. The side member 14 has a scale which is laid off in tenths or hundredths fractional parts, in the same manner as the base member 1. The sliding plate 20 is provided with a vernier scale 21. The side member 14 also has a vernier scale 22, which coöperates with the scale on the protractor 2. The side member 14 carries a projecting bracket 23, in which is journaled a post 24. A clamping member 25 carries an adjusting screw 26, which is threaded in the post 24. The clamping member 25, as shown in Fig. 2, is made in two parts, and by means of a clamping screw 27 may be firmly secured to the outer edge of the protractor. When it is desired to adjust the side piece 14 about its pivotal support, the clamping screw 27 is released, and said side member is moved about its pivot until the desired adjustment is approximately reached, after which the clamping screw is tightened to secure the clamping member to the protractor. Further adjustment of the side member 14 is then secured through the adjusting screw 26.

A side member 28 is pivotally attached to the sliding protractor 4, by means of the pivot post 29. Said side member 28 is made in two parts 30 and 31, which are secured by a yoke 32 in the same manner as described in connection with the side member 14. The sliding plate 33 is mounted between the side bars of the side member 31, and is pivotally connected to the sliding plate 21 by a pivot post 34 (see Fig. 4). The side member 28 is provided with a scale on its lower face, and the sliding plate 33 has a vernier scale. Said side member 28 carries a bracket 35. A clamping member 36 is adjustably connected to the protractor 4 by the clamping screw 37. An adjusting screw 38 connects the clamping member with the bracket 35. The pivot post 34 has a central opening 39. The pivot post of the side bar 15 has a central opening 40, and the pivot post 29 of the side member 38, is provided with a central opening 41.

In the outer face of the side rail 15 is a dove-tailed groove 42 (see Fig. 4), which is adapted to receive a dovetailed rib 43, carried by a protractor 44. An arm 45 is pivoted to the protractor at 46, and carries projecting studs 47 on its lower face. Said studs 47 are adapted to engage between the side bars 30 and 31 of the side member 28.

When it is desired to determine the length of two unknown sides of a triangle, having given the third side and the adjacent angles, my improved instrument is operated as follows: The length of the known side is laid off on the base member by sliding the protractor 4 by means of the toothed wheels. The side member 14 is then adjusted, so as to lay off one of the angles on the protractor 2. The side member 28 is then adjusted to lay off the other angle on the protractor 4. The scale reading on the side member 14 will give one of the unknown sides, and the scale reading on the side member 28, will give the other unknown side. The third angle may be read on the protractor 44. Let us suppose it is desired to determine the area of this triangle. The side 28 may be swung by sliding the protractor 4 to a vertical position, and by reading the scale on the side member 28, the altitude of the triangle determined, and having given the altitude and the base, the area of the triangle may be readily computed. When it is desired to plat the triangle, the triangle is formed in the manner above noted, and by means of a pin or other suitable instrument, a perforation may be made in the sheet on which the triangle is to be laid off, by inserting the pin through the opening or aperture in the pivot posts 34, 12 and 29.

While I have described only one or two methods of using my device, it will be obvious that it may be used in many ways in connection with the measuring or platting of triangles and triangulation systems.

Having thus described my invention, what I claim as new and desire to secure by Letters Patent, is:—

1. The combination of a base member, of a protractor secured at one end of said base member, a side member pivoted to said protractor, the pivotal bearing of said side member having an opening formed therethrough, a slide carried by said base member, a protractor connected with said slide, a second side member pivoted to said slide, the pivotal bearing of said second side member having an opening formed therethrough, and means for pivotally connecting said side members, the pivotal bearing of said connecting means having an opening formed therethrough.

2. The combination of a base member having a scale formed thereon, a protractor carried by said base member at one end thereof, a second protractor slidingly connected to said base member, side members pivotally connected to each of said protractors and comprising spaced bars, sliding plates mounted between the spaced bars of the side members, and means for pivotally connecting said sliding plates.

3. The combination of a base member having a scale formed thereon, a protractor secured to said base member, a slide mounted on said base member, a toothed rib carried by said base member, a toothed wheel carried by said slide for adjusting the same on said base member, a protractor carried by said slide, side members pivoted to said protractors, and means for pivotally connecting said side members.

4. The combination of a base member having a scale formed thereon, a protractor secured to said base member, a slide mounted on said base member, a toothed rib carried by said base member, a toothed wheel carried by said slide for adjusting the same on said base member, a protractor carried by said slide, side members pivoted to said protractors, said side members comprising spaced bars, sliding plates mounted between said spaced bars, and means for pivotally connecting said sliding plates.

5. The combination of a base member having a scale formed thereon, a protractor secured to said base member, a slide mounted on said base member, a toothed rib carried by said base member, a toothed wheel carried by said slide for adjusting the same on said base member, a protractor carried by said slide, side members pivoted to said protractors, said side members comprising spaced bars, sliding plates mounted between spaced bars, means for pivotally connecting said sliding plates, and means for adjustably securing the outer ends of said spaced bars.

6. The combination of a base member, a protractor connected to one end thereof, a side member pivoted to said protractor, and having a scale formed thereon, said side member comprising spaced bars, a sliding plate mounted between said spaced bars, a slide mounted on said base member, a protractor carried by said slide, a side member pivoted to said last named protractor and having a scale formed thereon, said last named side-member comprising spaced bars, a sliding plate mounted between said spaced bars, means for pivotally connecting the sliding plates carried by the side members, means for adjusting the slide on the base member, and an adjusting screw connected to each protractor and attached to the respective side members for adjusting the side members relative to the protractors.

7. The combination of a base member, a protractor connected to one end thereof, a side member pivoted to said protractor, and having a scale formed thereon, said side member comprising spaced bars, a sliding plate mounted between said spaced bars, a slide mounted on said base member, a protractor carried by said slide, a side member pivoted to said last named protractor and having a scale formed thereon, said last named side member comprising spaced bars, a sliding plate mounted between said spaced bars, means for pivotally connecting the sliding plates carried by the said members, a rack carried by the base member, a toothed wheel carried by the slide and engaging the rack for adjusting the slide on the base member, adjusting screws for each protractor, means for adjustably connecting said screws to the protractors, said screws being connected to the respective side members for adjusting the same relative to the protractors.

In testimony whereof I affix my signature, in presence of two witnesses.

PAUL JONES.

Witnesses:
 EDWARD L. KING,
 C. W. PLATT.